(12) United States Patent
Basa-Martinez

(10) Patent No.: US 11,295,545 B2
(45) Date of Patent: Apr. 5, 2022

(54) INFORMATION PROCESSING APPARATUS FOR GENERATING SCHEDULE DATA FROM CAMERA-CAPTURED IMAGE

(71) Applicant: KYOCERA Document Solutions Inc., Osaka (JP)

(72) Inventor: Diana Denise Basa-Martinez, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 301 days.

(21) Appl. No.: 16/701,691

(22) Filed: Dec. 3, 2019

(65) Prior Publication Data

US 2020/0193209 A1 Jun. 18, 2020

(30) Foreign Application Priority Data

Dec. 12, 2018 (JP) .............................. JP2018-232654
Nov. 27, 2019 (JP) .............................. JP2019-214150

(51) Int. Cl.
  *G06V 20/62* (2022.01)
  *G06Q 10/10* (2012.01)
  *G06F 3/01* (2006.01)
  *H04M 1/72451* (2021.01)
  *G06V 30/148* (2022.01)
  *G06V 30/10* (2022.01)

(52) U.S. Cl.
CPC .............. *G06V 20/63* (2022.01); *G06F 3/017* (2013.01); *G06Q 10/1093* (2013.01); *G06V 30/153* (2022.01); *H04M 1/72451* (2021.01); *G06V 30/10* (2022.01)

(58) Field of Classification Search
CPC ..... G06K 2209/01; G06K 2009/00738; G06K 9/325; G06K 9/344; G06F 3/0488
See application file for complete search history.

(56) References Cited

U.S. PATENT DOCUMENTS

| 2012/0030567 A1* | 2/2012 | Victor ................... | G06F 3/0482 715/702 |
| 2013/0050533 A1* | 2/2013 | Park ...................... | G06V 20/63 345/619 |
| 2014/0137039 A1* | 5/2014 | Kroeger .............. | G06F 3/04817 715/810 |

(Continued)

FOREIGN PATENT DOCUMENTS

JP        2013-054742 A        3/2013

*Primary Examiner* — Dung Hong
(74) *Attorney, Agent, or Firm* — IP Business Solutions, LLC

(57) ABSTRACT

An information processing apparatus includes a camera, a display device, a touch panel, and a control device. The control device functions as a controller that, upon specification of, based on a trajectory of a swipe gesture accepted by the touch panel on an image captured by the camera and being displayed on the display device, a strip-shaped region containing start and end points of the swipe gesture and having a predetermined constant width perpendicular to a direction of the swipe gesture, recognizes a text in the specified region, extracts from the recognized text a title of an event and a date of the event, associates the extracted title of the event and date with each other, and sets the associated title of the event and date as schedule data.

5 Claims, 13 Drawing Sheets

(56) References Cited

U.S. PATENT DOCUMENTS

| | | | |
|---|---|---|---|
| 2016/0077793 A1* | 3/2016 | Disano | G06F 3/04883 715/728 |
| 2017/0278069 A1* | 9/2017 | Guo | G06F 3/04842 |
| 2017/0351424 A1* | 12/2017 | Murata | G06F 3/04842 |
| 2018/0239520 A1* | 8/2018 | Hinckley | G06F 3/0482 |

* cited by examiner

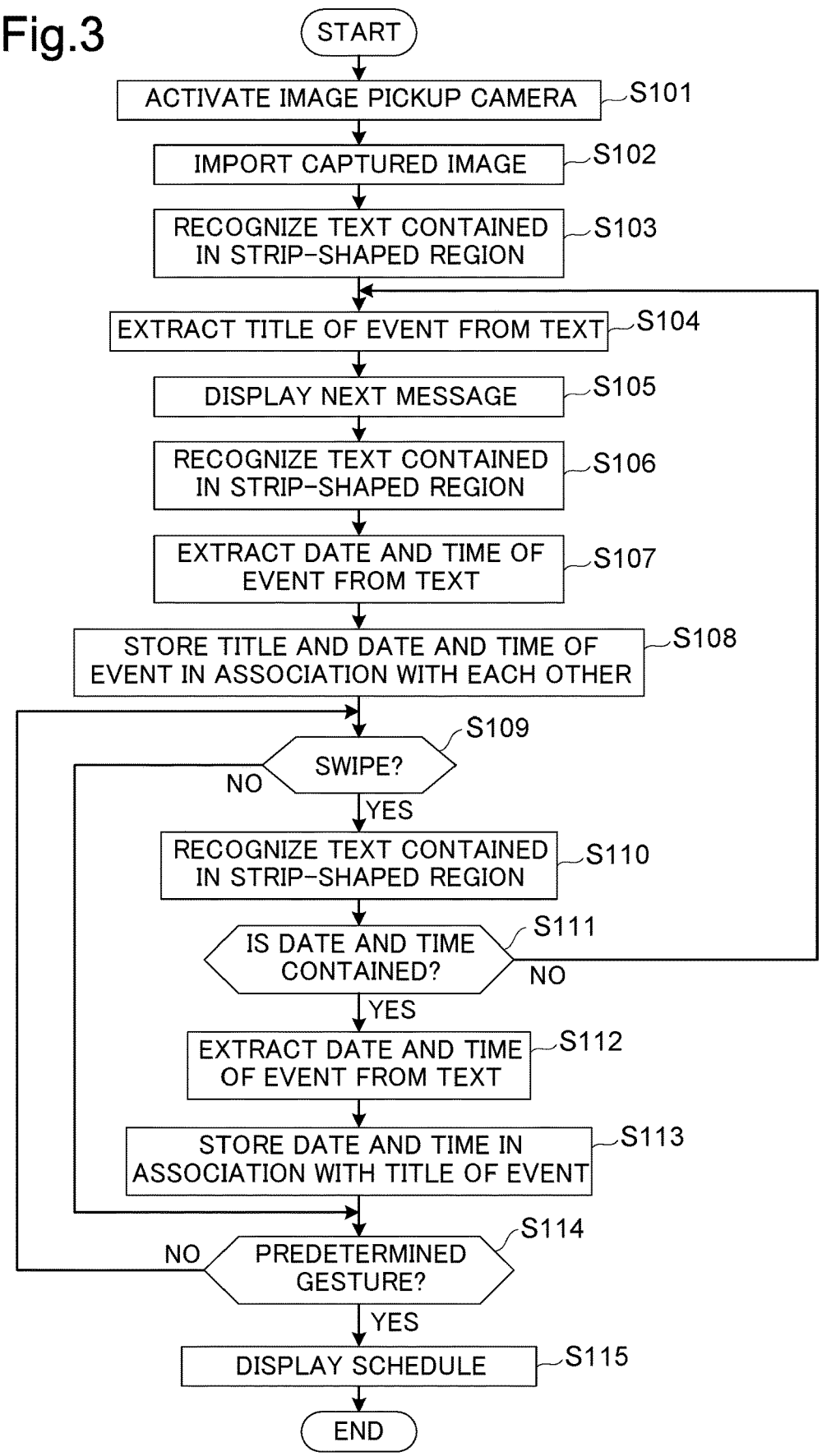

| YEAR | 2018 |
| --- | --- |
| YEAR | 2019 |
| YEAR | ⋮ |
| MONTH | FEBRUARY |
| MONTH | JANUARY |
| MONTH | ⋮ |
| DAY | 01 |
| DAY | 02 |
| DAY | ⋮ |
| TIME | 12:00 |
| TIME | 12:01 |
| TIME | ⋮ |

Fig.9

LEGAL BASES:

PROCLAMATION NO. 269, S. 2017

(A) REGULAR HOLIDAYS

| | |
|---|---|
| JAN 1 (MON) | NEW YEAR'S DAY |
| MOVABLE DATE (MAR 29) | MAUNDY THURSDAY |
| MOVABLE DATE (MAR 30) | FRIDAY |
| JUN 12 (TUE) | INDEPENDENCE DAY |
| LAST MONDAY OF AUGUST | NATIONAL HEROES DAY |
| DEC 25 (TUE) | CHRISTMAS DAY |
| DEC 30 (SUN) | RIZAL DAY |

(B) NATIONWIDE SPECIAL HOLIDAYS

| | |
|---|---|
| FEB 16 (FRI) | CHINESE NEW YEAR |
| MOVABLE DATE (MAR 31) | BLACK SATURDAY |
| AUG 21 (TUE) | NINOY AQUINO DAY |
| ⋮ | ⋮ |

PLEASE SPECIFY TITLE AND DATE AND TIME OF EVENT.

Fig.10

LIST OF SCHEDULE DATA   SL2

| DATE AND TIME | TITLE OF EVENT |
|---|---|
| JAN 1 | NEW YEAR'S DAY |
| MAR 29 | MOVABLE DATE |
| MAR 30 | MOVABLE DATE |

INFORMATION PROCESSING APPARATUS FOR GENERATING SCHEDULE DATA FROM CAMERA-CAPTURED IMAGE

INCORPORATION BY REFERENCE

This application claims priority to Japanese Patent Application No. 2018-232654 filed on 12 Dec. 2018 and Japanese Patent Application No. 2019-214150 filed on 27 Nov. 2019, the entire contents of which are incorporated by reference herein.

BACKGROUND

The present disclosure relates to information processing apparatuses equipped with a camera and a display device and particularly relates to a technique for generating schedule data based on an image captured by a camera.

As is well known, there is an information processing apparatus equipped with a camera and a display device and capable of displaying on the display device an image captured by the camera. In an example of such a known information processing apparatus, when an image captured by a camera is displayed on a display device and an arbitrary location in the displayed image is specified, a recognition region containing the specified location is automatically defined, data is extracted from the recognition region, the extracted data is classified in accordance with a predetermined classification rule, and schedule data is generated from the extracted data. In this information processing apparatus, for example, large characters are extracted from the data and a character sequence composed of the extracted large characters is set as the title of an event.

SUMMARY

A technique improved over the aforementioned technique is proposed as one aspect of the present disclosure.

An information processing apparatus according to an aspect of the present disclosure includes a camera, a display device, a touch panel, and a control device. The camera captures an image. The display device displays the image captured by the camera. The touch panel is provided on a screen of the display device. The control device includes a processor and functions, through the processor executing a control program, as a controller that, upon specification of, based on a trajectory of a swipe gesture accepted by the touch panel on the image being displayed on the display device, a strip-shaped region containing start and end points of the swipe gesture and having a predetermined constant width perpendicular to a direction of the swipe gesture, recognizes a text in the specified region, extracts from the recognized text a title of an event and a date, associates the extracted title of the event and date with each other, and sets the associated title of the event and date as schedule data.

BRIEF DESCRIPTION OF THE DRAWINGS

FIG. 3 is a flowchart showing processing procedures for recognizing respective texts in two strip-shaped regions, extracting the title and a date and time of an event from the recognized texts, and generating schedule data.

FIG. 5 is a diagram conceptually showing a date and time data table previously stored in a storage device.

FIG. 9 is a view showing a strip-shaped region containing the date and time and title of an event in an image being displayed on the display device.

FIG. 10 is a view showing another list of schedule data displayed on the display device.

DETAILED DESCRIPTION

First Embodiment

Figure 1:
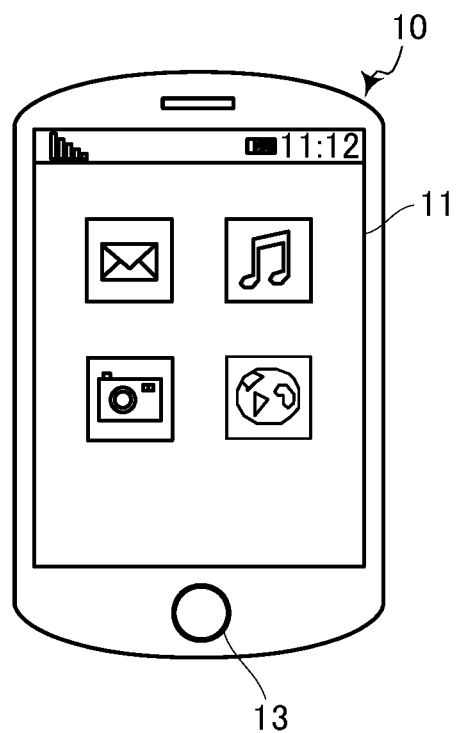
FIG. 1 is a plan view showing the appearance of an information processing apparatus according to one embodiment of the present disclosure.
Figure 2:
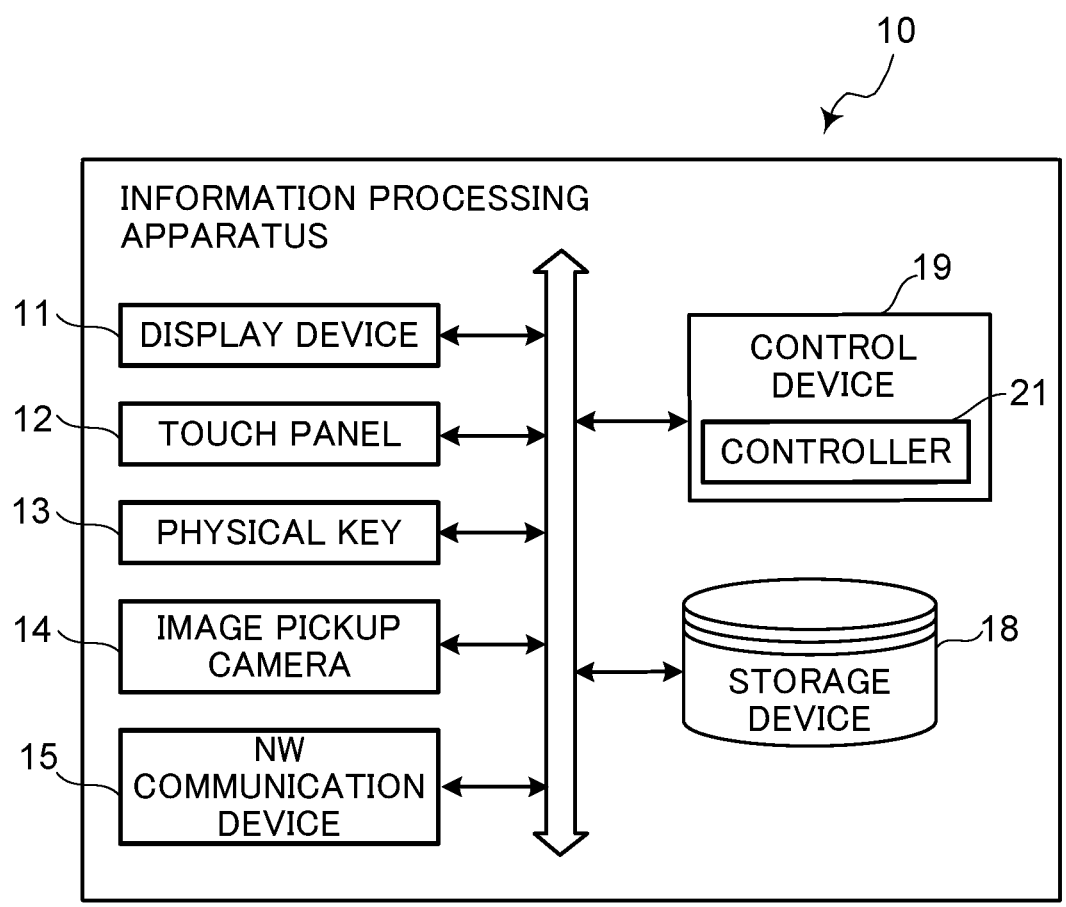
FIG. 2 is a block diagram showing an internal configuration of the information processing apparatus according to the one embodiment of the present disclosure.

Hereinafter, a description will be given of a first embodiment of the present disclosure with reference to the drawings. FIG. 1 is a plan view showing the appearance of an information processing apparatus according to the first embodiment of the present disclosure. FIG. 2 is a block diagram showing an internal configuration of the information processing apparatus according to the first embodiment of the present disclosure.

The information processing apparatus 10 according to this embodiment is, for example, a smartphone or a mobile device and includes a display device 11, a touch panel 12, a physical key 13, an image pickup camera 14, a network communication device (NW communication device) 15, a storage device 18, and a control device 19. These components are capable of transferring data or signals to and from each other via a bus.

The display device 11 is formed of a liquid crystal display (LCD), an organic EL (OLED: organic light-emitting diode) or others. For example, a plurality of icons are displayed on the screen of the display device 11.

The touch panel 12 is a touch panel of a resistive film system, a capacitance system or any other system. The touch panel 12 is disposed on the screen of the display device 11 and is capable of detecting a touch on the touch panel 12 with a user's finger or the like, together with a point of touch, and thus allowing a user's instruction for a below-described control device 19 on the screen of the display device 11 to be input through the touch panel 12. Therefore, the touch panel 12 serves as an operation device through which a user's operation by gesture on the screen of the display device 11 is to be input.

The information processing apparatus 10 further includes, in addition to the above touch panel 12, a physical key 13 as an operation device through which a user's operation is to be input.

The image pickup camera 14 is a camera including a lens and an imaging device (such as a charge coupled device (CCD) or a CMOS (complementary metal oxide semiconductor)), captures an image of the outside, and outputs image data representing the captured image.

The network communication device 15 is a communication interface including a communication module, such as a LAN (local area network) chip. The network communication device 15 is connected via a LAN, the Internet or the like to external terminal devices, such as a server.

The storage device 18 is a storage device, such as a RAM (random access memory) or an HDD (hard disk drive), and stores various application programs and various types of data.

The control device 19 is formed of a processor, a RAM (random access memory), a ROM (read only memory), and so on. The processor is, for example, a CPU (central processing unit), an ASIC (application specific integrated circuit) or an MPU (micro processing unit). When a control program stored in the above ROM or the storage device 18 is executed by the above processor, the control device 19 functions as a controller 21.

The control device 19 is connected to the display device 11, the touch panel 12, the physical key 13, the image pickup camera 14, the network communication device 15, the storage device 18, and so on. The controller 21 performs the operation control of each of the above components and signal or data transfer to and from each of the components.

The controller 21 serves as a processor that executes various types of processing. Furthermore, the controller 21 has the functions of controlling the display operation of the display device 11 and controlling the communication operation of the network communication device 15.

In the information processing apparatus 10 according to the first embodiment, the storage device 18 stores a schedule management application. The controller 21 operates in accordance with the schedule management application and thus functions as a scheduler for managing the schedule.

When a user of the information processing apparatus 10 uses the image pickup camera 14 to capture an image of an advertisement or a poster for an event or the like, the controller 21 allows the display device 11 to display the captured image. Thereafter, based on user's operations, the controller 21 sequentially accepts, through the touch panel 12, specifications of arbitrary two strip-shaped regions containing the title and date and time, respectively, of the event in the image being displayed on the display device 11. The controller 21 recognizes a text in the first specified one of the two regions, extracts the title of the event from the text, then recognizes a text in the later specified one of the two regions, extracts the date and time of the event from the text, associates the title and date and time of the event with each other, allows the associated title and date and time of the event to be stored as schedule data for use by the scheduler when managing the schedule. Here, "date and time" indicates, among "date" and "time", at least either one of them.

Next, a detailed description will be given of processing procedures for, as described above, recognizing texts in two strip-shaped regions, extracting the title and date and time of an event from the recognized texts, and generating schedule data, with reference to the flowchart shown in FIG. 3 and so on.

The user of the information processing apparatus 10 makes, for example, a touch gesture on a predetermined icon being displayed on the screen of the display device 11 to input, through the touch panel 12, an instruction to execute processing for generating schedule data. In accordance with this instruction, the controller 21 starts the processing for generating schedule data, thus first activating the image pickup camera 14 (step S101). At this time, the controller 21 allows the display device 11 to display on the screen an image being captured by the image pickup camera 14 and also display on the screen a massage prompting the user to take an image of an advertisement, a poster or the like.

Figure 4A:
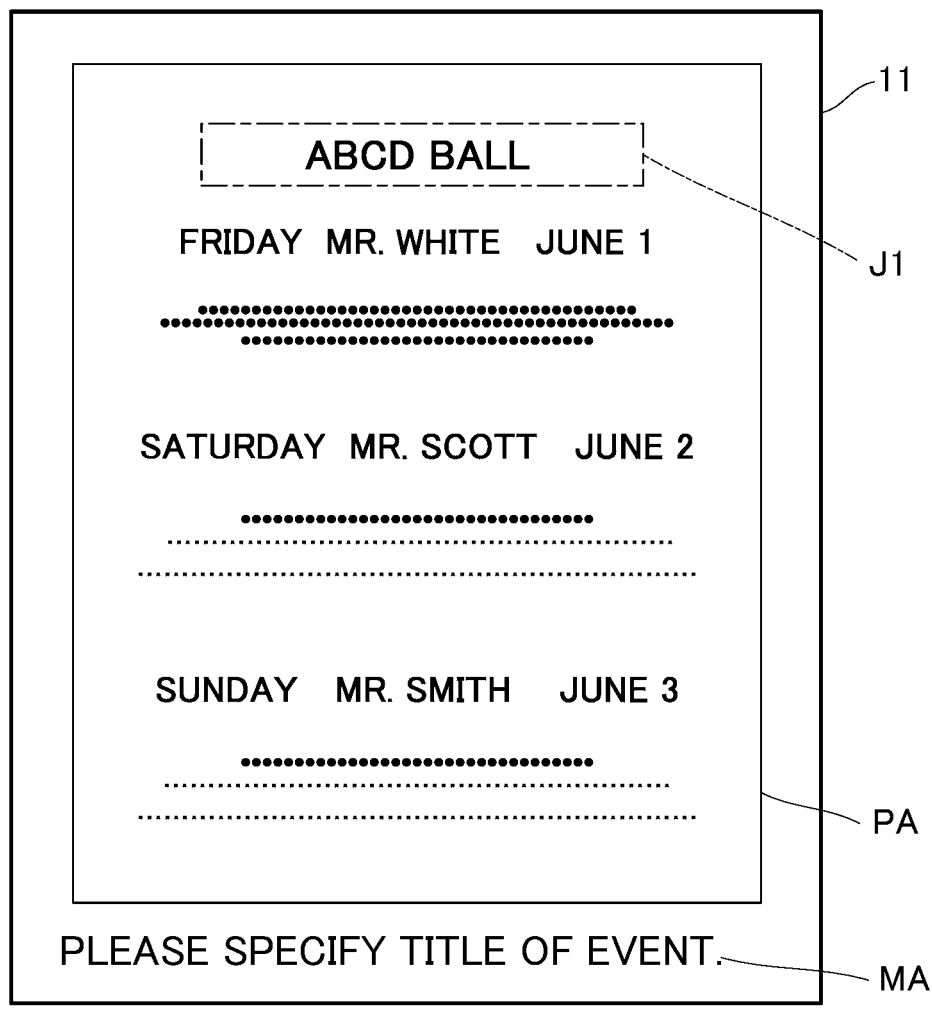
FIG. 4A is a view showing a strip-shaped region containing the title of an event in an image being displayed on a display device.

In response to the message, the user keeps an image of an advertisement, a poster or the like captured by the image pickup camera 14 and displayed on the screen of the display device 11. In this state, the user operates the physical key 13 of the information processing apparatus 10 to input an instruction to import the image being captured by the image pickup camera 14. In accordance with this instruction, the controller 21 allows the storage device 18 to store the image captured by the image pickup camera 14 (step S102). Simultaneously with the above operation, the controller 21 allows the display device 11 to display the stored captured image as a still image on the screen. For example, an image PA of a poster shown in FIG. 4A is captured by the image pickup camera 14 and is then kept displayed on the screen of the display device 11. The controller 21 allows the display device 11 to display on the screen, together with the poster image PA, a message MA prompting the user to specify the title of an event.

In response to the message MA, the user makes a gesture of sliding his/her finger, i.e., a swipe gesture, on a region of the poster image PA where the title of an event is displayed (a region where the title desired to be set as schedule data by the user is displayed, the region being determined by the user and corresponding to a display region J1 in FIG. 4A). This swipe gesture is made from the head to the end of the above display region J1 for the title of the event.

The controller 21 detects, as a strip-shaped region in which a text is to be recognized, a strip-shaped region within a predetermined range from a trajectory of the swipe gesture accepted by the touch panel 12, i.e., a region containing start and end points of the swipe gesture and having a predetermined constant width perpendicular to a direction of the swipe gesture (for example, the height of standard-size characters displayed on the display device 11). In this embodiment, the strip-shaped region in which a text is to be recognized coincides with the above display region J1. Hereinafter, the strip-shaped region is referred to as the region J1.

The controller 21 subjects an image portion of the strip-shaped region J1 specified by the above detection to known OCR processing to recognize a text (a first text defined in What is Claimed is) contained in the strip-shaped region J1 (step S103), considers the recognized text to be the title of an event, and extracts the title of the event (step S104).

Figure 4B:
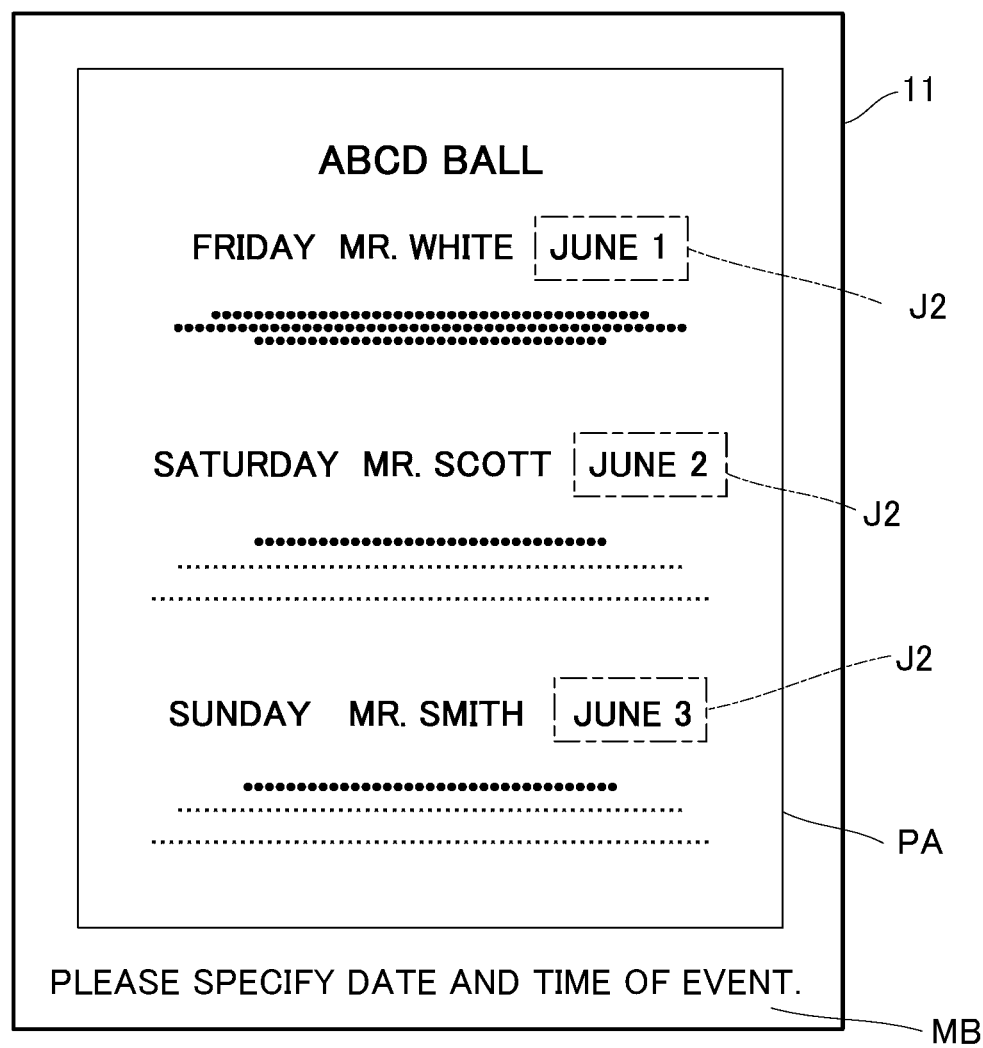
FIG. 4B is a view showing strip-shaped regions containing the dates and times of the event in the image being displayed on the display device.

When extracting the title of the event, as shown in FIG. 4B, the controller 21 allows the display device 11 to display on the screen, together with the poster image PA, a message MB prompting the user to specify the date and time of the event, in place of the message MA (step S105).

In response to the message MB, the user makes a swipe gesture on a strip-shaped region J2 containing the date and time of the event in the poster image PA. This swipe gesture is also made from the head to the end of the strip-shaped region J2.

In the same manner as in the case of the above region J1, the controller 21 detects through the touch panel 12, as the strip-shaped region J2, a region containing start and end points of the swipe gesture and having a predetermined constant width perpendicular to a direction of the swipe gesture. Furthermore, the controller 21 subjects an image portion of the strip-shaped region J2 to OCR processing to recognize a text (a second text defined in What is Claimed is) contained in the strip-shaped region J2 (step S106).

Then, the controller 21 extracts from the recognized text the date and time of the event represented by numerals or characters (step S107). For example, the controller 21 extracts, with reference to a date and time data table ND previously stored in the storage device 18 and shown in FIG. 5, the date and time of the event from the text contained in the strip-shaped region J2. The date and time data table ND previously stores numerals and characters representing dates and times, including 2018, 2019, . . . , February, January, . . . , 01, 02, . . . , 12:00, 12:01, . . . , etc. When the numerals or characters contained in the strip-shaped region J2 coincide with numerals or characters contained in the date and time data table ND, the controller 21 extracts the coincident numerals or characters as the year, month, day, and time of the event. Furthermore, in the case of sequentially extracting two times from the text contained in the strip-shaped region J2, the controller 21 determines the time having a smaller numerical value to be the starting time of the event and extracts it, and determines the time having a larger numerical value to be the ending time of the event and extracts it.

Then, the controller 21 associates the title of the event extracted in step S104 with the date and time of the event extracted in step S107 and allows the storage device 18 to store the associated title and date and time of the event as schedule data (step S108).

The user may additionally make a swipe gesture ("Yes" in step S109). Also in this case, in the same manner as in the case of the region J1, the controller 21 detects through the touch panel 12 a strip-shaped region specified by the swipe gesture and subjects an image portion of the strip-shaped region stored in the storage device 18 to OCR processing to recognize a line of text contained in the strip-shaped region (step S110).

The controller 21 determines, with reference to the date and time data table ND, whether or not the recognized text contains any date and time of an event (step S111). For example, when the controller 21 determines that the text contains no date and time of an event ("No" in step S111), the controller 21 returns the flow to the processing task in step S104, considers the text contained in the strip-shaped region to be the title of an event, extracts the title of the event (step S104), and then repeats the processing tasks in step S105 to step S108. In this case, the controller 21 allows the display device 11 to display on the screen a message MB prompting the user to specify the date and time of the event (step S105). When the user makes a swipe gesture on a strip-shaped region containing the date and time of the event, the controller 21 subjects an image portion of the strip-shaped region stored in the storage device 18 to OCR processing to recognize a line of text contained in the strip-shaped region (step S106), extracts the date and time of the event composed of numerals or characters from the recognized text (step S107), associates the title of the event extracted in step S104 and the date and time of the event extracted in step S107 with each other, and allows the storage device 18 to store the associated title and date and time of the event as schedule data (step S108).

When in this manner the user makes respective swipe gestures on a strip-shaped region containing the title of an event and a strip-shaped region containing the date and time of the event, followed by an additional swipe gesture on another strip-shaped region containing the title of another event, the controller 21 repeats the processing tasks in step S104 to step S108, so that schedule data in which the title and date and time of the other event are associated with each other is stored in the storage device 18. As a result, a plurality of sets of schedule data composed of respective pairs of associated titles and dates and times of various events are stored in the storage device 18.

On the other hand, when in step S111 the controller 21 determines, with reference to the date and time data table ND, that the recognized text contains the date and time of an event ("Yes" in step S111), the controller 21 extracts the date and time of the event (step S112), associates the extracted date and time of the event, together with the date and time of the event extracted in step S107 (i.e., the previously extracted date and time of the event in the case where the extraction of the date and time of the event in step S112 follows close on the previous extraction of the date and time of the event), with the title of the event extracted in step S104 (i.e., the last extracted title prior to the extraction of the date and time in step S112), and allows the storage device 18 to store the associated title and dates and times of the event as schedule data (step S113).

Thereafter, when a predetermined gesture (for example, a double tap) is not made on the screen of the display device 11 ("No" in step S114), the controller 21 returns the flow to the processing task in step S109.

When in this manner the user makes respective swipe gestures on a strip-shaped region containing the title of an event and a strip-shaped region containing the date and time of the event, followed by an additional swipe gesture or gestures on another or other strip-shaped regions each containing another date and time, the number of dates and times of the event associated with the title of the event extracted in step S104 increases on each occurrence of a swipe gesture, so that schedule data in which a plurality of dates and times of the event are associated with the same title of the event is stored in the storage device 18.

Figure 6:
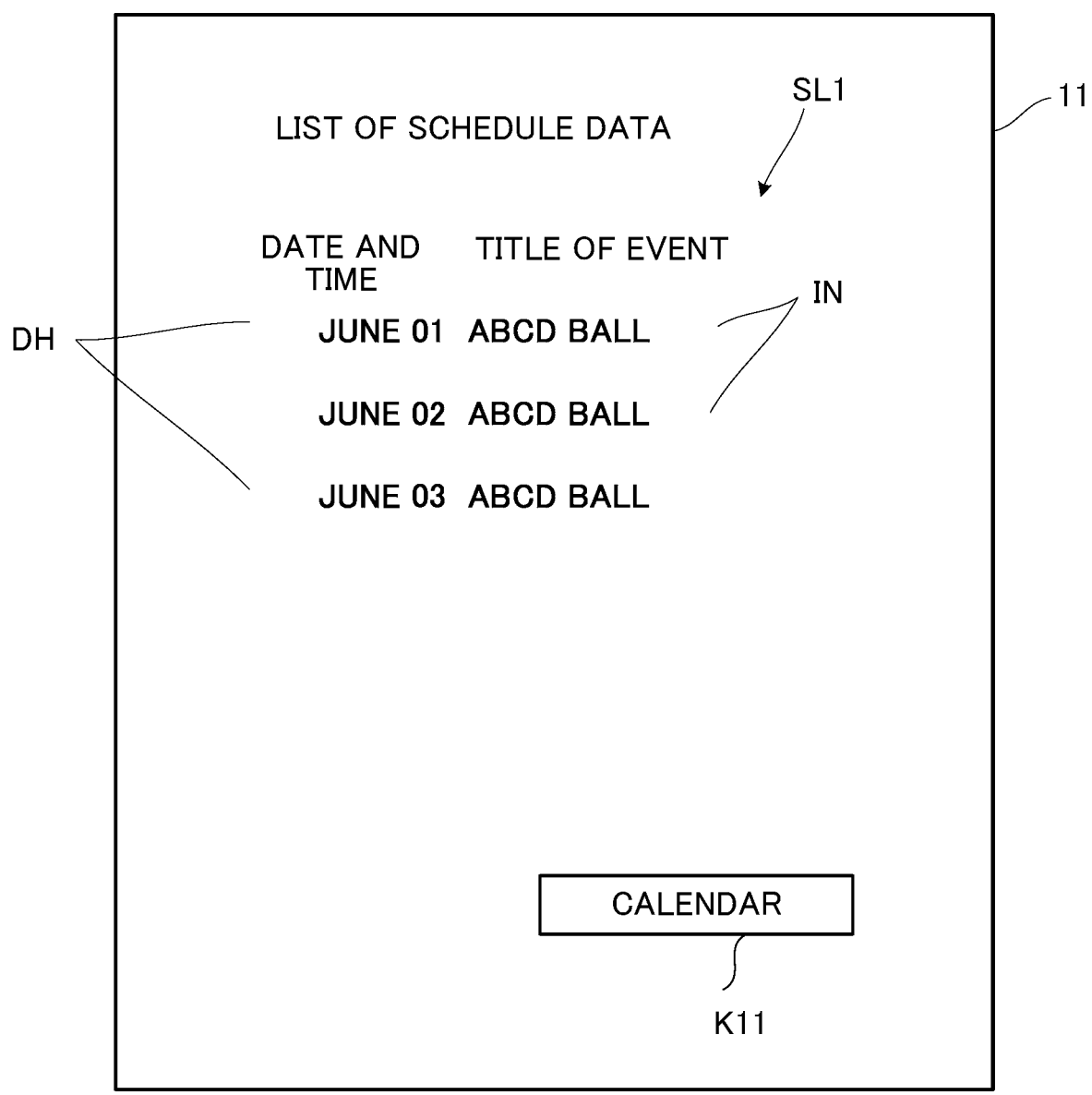
FIG. 6 is a view showing a list of schedule data displayed on the display device.

When, after the step S113, the user does not make a swipe gesture but makes the above predetermined gesture on the screen of the display device 11, the controller 21 accepts, based on the predetermined gesture, an instruction to display a list of schedule data ("Yes" in step S114), generates, based on the titles and dates and times of events in the sets of schedule data stored in the storage device 18, a list of schedule data SL1 shown as an example in FIG. 6, and allows the display device 11 to display the list SL1 on the screen (step S115). Then, the controller 21 ends the processing shown in FIG. 3.

Figure 7:
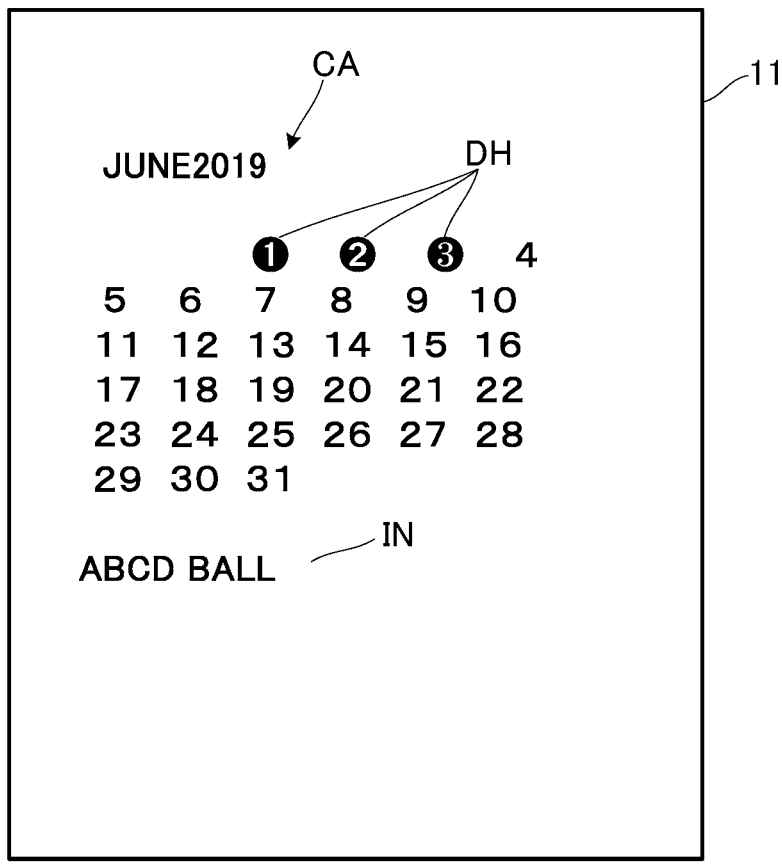
FIG. 7 is a view showing a calendar displayed on the display device.

The controller 21 allows the displayed list of schedule data SL1 shown in FIG. 6 to show the title of the event IN extracted in step S104 and one or more dates and times of the event DH extracted in step S107 and also show a CALENDAR key K11. When the user makes a touch gesture on the CALENDAR key K11, the controller 21 accepts, through the touch panel 12, an instruction corresponding to the CALENDAR key K11 and, in accordance with this instruction, allows the display device 11 to display on the screen a calendar CA shown as an example in FIG. 7. The controller 21 allows the calendar CA to show the title of the event IN and show the dates and times of the event DH by highlighting.

When in the known information processing apparatus an arbitrary location (a location where a touch gesture has been made) on an image being displayed on the display device is specified, a recognition region containing the arbitrary location is automatically defined. Therefore, there arises a problem that the recognition region may not properly be defined. For example, if the recognition region contains a plurality of lines of text, there arise a problem that a necessary text may not properly be selected.

Unlike the above, when in the first embodiment arbitrary two strip-shaped regions containing the title and date and time, respectively, of an event in an image being displayed on the display device 11 are sequentially specified by swipe gestures, the title of the event is extracted from a text contained in the first specified strip-shaped region, the date and time of the event is extracted from a text contained in the later specified strip-shaped region, and the extracted title and date and time of the event are associated with each other and set as schedule data. Therefore, the title and date and time of the event can be surely extracted from the image and schedule data can be surely generated.

Although in the first embodiment the controller 21 first extracts the title of an event and then extracts the date and time of the event, the controller 21 may, conversely, first extract the date and time of an event from a text contained in a first specified strip-shaped region and then extract the title of the event from a text contained in a later specified strip-shaped region.

Second Embodiment

Next, a description will be given of an information processing apparatus according to a second embodiment of the present disclosure. The information processing apparatus according to the second embodiment has, like the information processing apparatus 10 according to the first embodiment, the appearance shown in FIG. 1 and the internal configuration shown in FIG. 2.

In the information processing apparatus 10 according to the second embodiment, when, with an image of an advertisement, a poster or the like displayed on the screen of the display device 11, the user specifies a strip-shaped region in the image of the advertisement, poster or the like by a swipe gesture, the controller 21 detects the strip-shaped region through the touch panel 12, recognizes a text contained in the strip-shaped region, extracts the date and time of an event from a portion of the recognized text, and then extracts the title of the event from the remaining portion of the recognized text. To put is plainly, the controller 21 extracts both the date and time and title of an event from the same strip-shaped region. Thus, from an image of an advertisement, a poster or the like, the title and date and time of an event can be surely extracted and schedule data can be surely generated.

Figure 8:
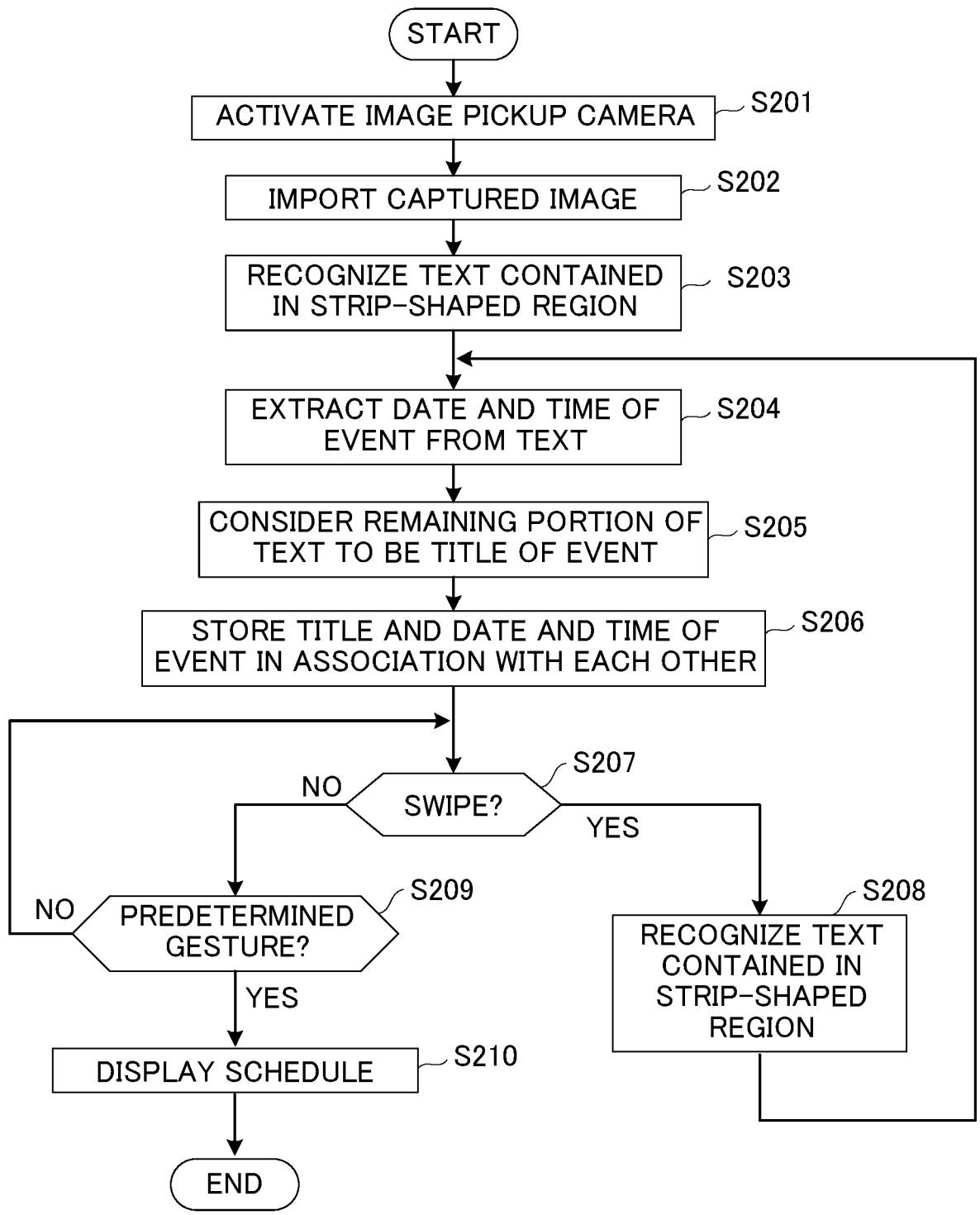
FIG. 8 is a flowchart showing processing procedures for recognizing a line of text contained in a strip-shaped region and sequentially extracting the date and time and title of an event from the recognized text.

Next, a detailed description will be given, with reference to the flowchart shown in FIG. 8 and so on, of processing procedures for, in accordance with the second embodiment, recognizing a text contained in a strip-shaped region and sequentially extracting the date and time and title of an event from the recognized text.

The user of the information processing apparatus 10 makes, for example, a touch gesture on a predetermined icon being displayed on the screen of the display device 11 to input, through the touch panel 12, an instruction to execute processing for generating schedule data. In accordance with this instruction, the controller 21 starts the processing for generating schedule data, thus first activating the image pickup camera 14 (step S201). At this time, the controller 21 allows the display device 11 to display on the screen an image being captured by the image pickup camera 14 and also display on the screen a massage prompting the user to take an image of an advertisement, a poster or the like.

In response to the message, the user keeps an image of an advertisement, a poster or the like captured by the image pickup camera 14 and displayed on the screen of the display device 11. In this state, the user operates the physical key 13 of the information processing apparatus 10 to input an instruction to import the image being captured by the image pickup camera 14. In accordance with this instruction, the controller 21 allows the storage device 18 to store the image captured by the image pickup camera 14 (step S202). Simultaneously with the above operation, the controller 21 allows the display device 11 to display the stored captured image as a still image on the screen. For example, an image PB of an advertisement shown in FIG. 9 is captured by the image pickup camera 14 and is then kept displayed on the screen of the display device 11. The controller 21 allows the display device 11 to display on the screen, together with the advertisement image PB, a message MC prompting the user to specify the title and date and time of an event.

In response to the message MC, the user makes a swipe gesture on a strip-shaped region J3 containing the title and date and time of an event in the advertisement image PB. This swipe gesture is made from the head to the end of the strip-shaped region J3.

The controller 21 detects, as a strip-shaped region in which a text is to be recognized, a strip-shaped region within a predetermined range from a trajectory of the swipe gesture accepted by the touch panel 12, i.e., a region containing start and end points of the swipe gesture and having a predetermined constant width perpendicular to a direction of the swipe gesture. In this embodiment, the strip-shaped region in which a text is to be recognized coincides with the above display region J3. Hereinafter, the strip-shaped region is referred to as the region J3.

The controller 21 recognizes, by known OCR processing, a text contained in the strip-shaped region J3 specified by the above detection (step S203) and extracts the date and time of an event composed of numerals or characters from the recognized text (step S204). For example, the controller 21 extracts, with reference to the above date and time data table ND (see FIG. 5), the date and time of the event from the text contained in the strip-shaped region J3. Furthermore, in the case of sequentially extracting two times from the text contained in the strip-shaped region J3, the controller 21 determines the time having a smaller numerical value to be the starting time of the event and extracts it, and determines the time having a larger numerical value to be the ending time of the event and extracts it.

Thereafter, the controller 21 considers a sequence of characters forming the remaining portion of the text recognized in step S203, i.e., a portion of the text other than the date and time of the event extracted in step S204, to be the title of the event and extracts the title of the event (step S205).

Then, the controller 21 associates the date and time of the event extracted in step S204 with the title of the event extracted in step S205 and allows the storage device 18 to store the associated date and time and title of the event as schedule data (step S206).

The user may additionally make a swipe gesture ("Yes" in step S207). Also in this case, in the same manner as in the case of the region J3, the controller 21 detects through the touch panel 12 an image portion of a strip-shaped region specified by the swipe gesture, subjects the image portion of the strip-shaped region stored in the storage device 18 to OCR processing to recognize a text contained in the strip-shaped region (step S208), and repeats the processing tasks in step S204 and later steps.

When in this manner the user makes an additional swipe gesture on a region containing both the title and date and time of an event, the controller 21 repeats, on each occurrence of a swipe gesture, the processing tasks in step S204 to step S206, so that schedule data in which the title and date and time of the event are associated with each other is extracted from an image portion of the region. As a result, a plurality of sets of schedule data each composed of a pair of associated title and date and time of an event are stored in the storage device 18.

Figure 10:
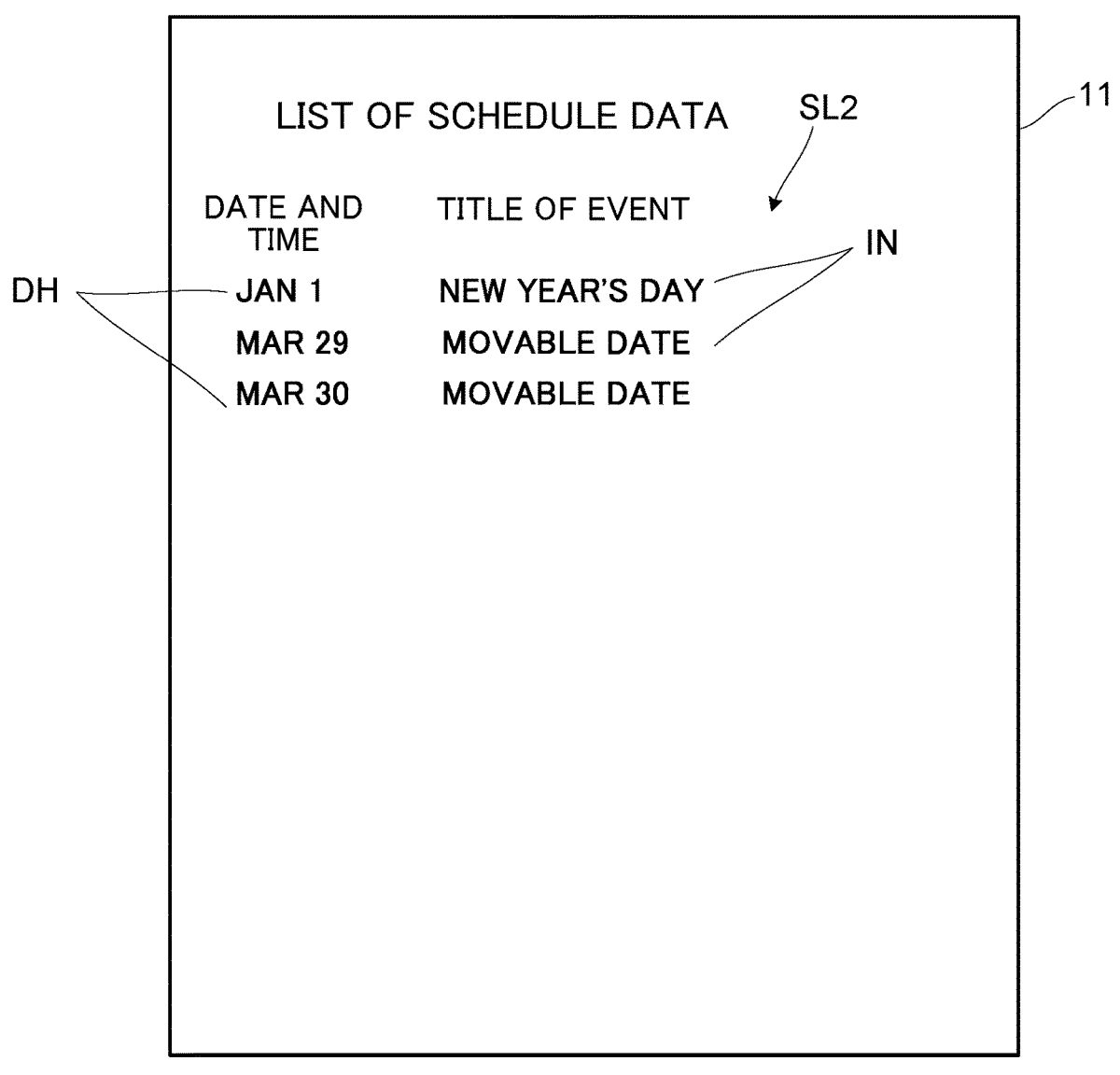

When, after the step S206, the user does not make a swipe gesture but makes a predetermined gesture for inputting an instruction to display a list of schedule data on the screen of the display device 11, the controller 21 accepts, based on the predetermined gesture, the instruction to display a list of schedule data ("Yes" in step S209), generates, based on the titles and dates and times of events in the sets of schedule data stored in the storage device 18, a list of schedule data SL2 shown as an example in FIG. 10, and allows the display device 11 to display the list SL2 on the screen (step S210). FIG. 10 shows an example where the controller 21 allows the list of schedule data SL2 to show a plurality of pairs of event dates and times DH and titles IN extracted in steps S204 and S205. After step S210, the controller 21 ends the processing.

As just described, when in the second embodiment a strip-shaped region containing the title and date and time of an event in an image being displayed on the display device 11 is specified by a swipe gesture, the date and time of the event is first extracted from a portion of a text contained in the specified strip-shaped region, the title of the event is then extracted from the remaining portion of the text. Therefore, both the title and date and time of an event can be surely extracted from an image, so that schedule data can be surely generated.

In the second embodiment, when an additional swipe gesture on another strip-shaped region containing the title and date and time of an event in an image being displayed on the display device 11 is repeated, the controller 21 detects the strip-shaped region on each occurrence of a swipe gesture. However, for example, the user may make swipe gestures with a plurality of fingers to specify a plurality of strip-shaped regions and the controller 21 may collectively detect the plurality of strip-shaped regions based on the user's swipe gestures.

Figure 11:
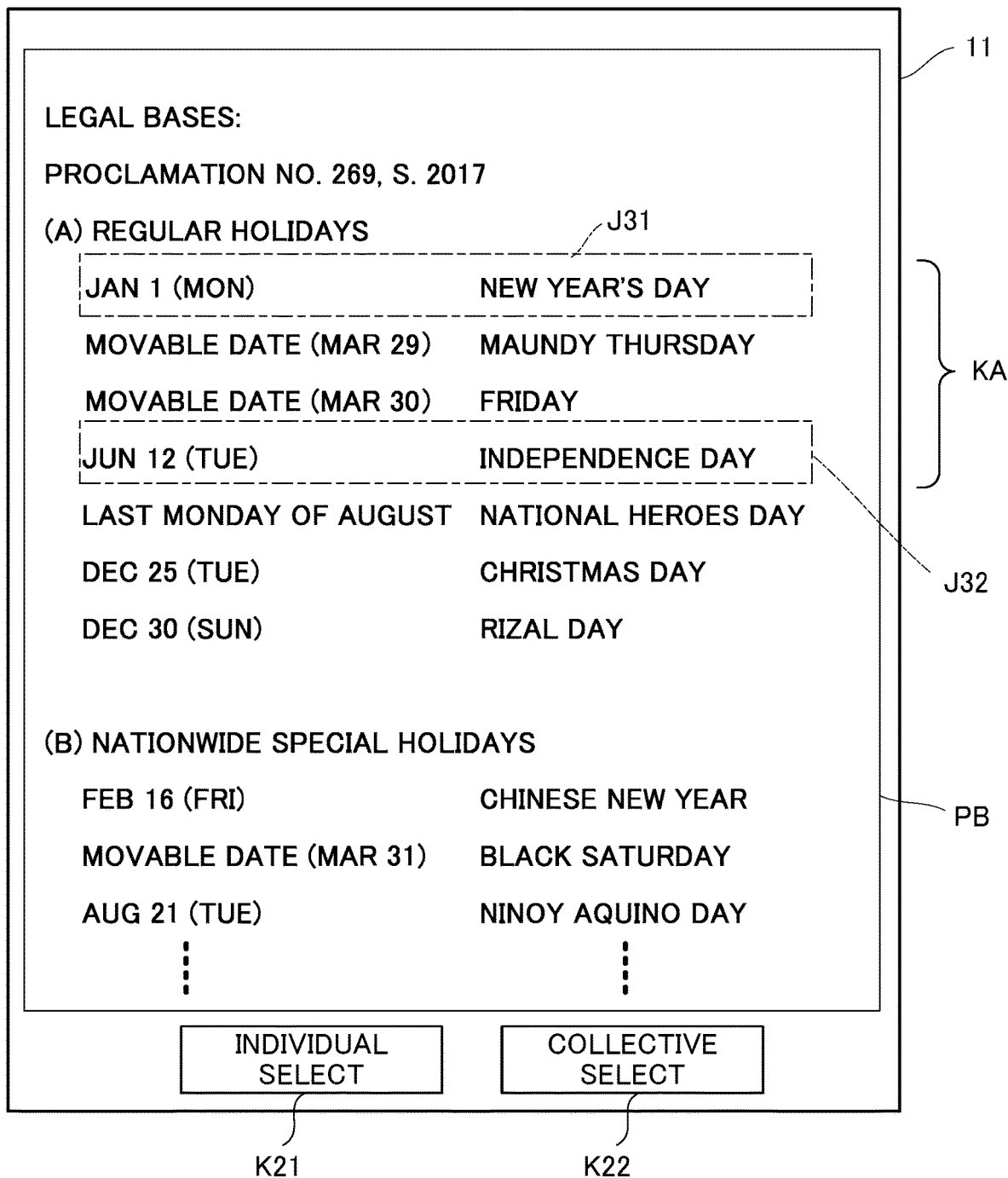
FIG. 11 is a view showing a modification for specifying strip-shaped regions in the image being displayed on the display device.

For example, as shown in FIG. 11, the controller 21 allows the display device 11 to display on the screen, together with the advertisement image PB, an INDIVIDUAL SELECT key K21 for individually selecting each strip-shaped region and a COLLECTIVE SELECT key K22 for collectively selecting a plurality of strip-shaped regions. When the user makes a touch gesture on the INDIVIDUAL SELECT key K21, the controller 21 accepts, through the touch panel 12, an instruction to execute the processing shown in FIG. 8 and executes the processing. Therefore, in this case, unless repeating a swipe gesture on each region, the user cannot allow the controller 21 to detect a plurality of strip-shaped regions.

On the other hand, when the user makes a touch gesture on the COLLECTIVE SELECT key K22, the controller 21 accepts, through the touch panel 12, an instruction to execute a processing task for recognizing texts in two regions. In this case, the controller 21 waits for the completion of swipe gestures on two regions in the advertisement image PB. When at this time the user makes respective swipe gestures on two regions J31, J32 (see FIG. 11), the controller 21 detects, as strip-shaped regions in which texts are to be recognized, strip-shaped regions within respective predetermined ranges from trajectories of the swipe gestures accepted by the touch panel 12, i.e., regions each containing start and end points of the swipe gesture and having a predetermined constant width perpendicular to a direction of the swipe gesture. Thus, the controller 21 detects the two strip-shaped regions J31, J32. Furthermore, the controller 21 defines an area KA from one to the other of the two strip-shaped regions J31, J32 (inclusive of both the strip-shaped regions J31, J32), subjects the area KA to OCR processing to detect a plurality of lines of texts present in the area KA, subjects the detected texts to the processing tasks in steps S204 and S205 to extract the dates and times of events from portions of the detected texts and also extract the titles of the events from the remaining portions of the texts, and allows the storage device 18 to store a plurality of sets of schedule data each containing a pair of extracted and associated date and time and title of an event.

Figure 12:
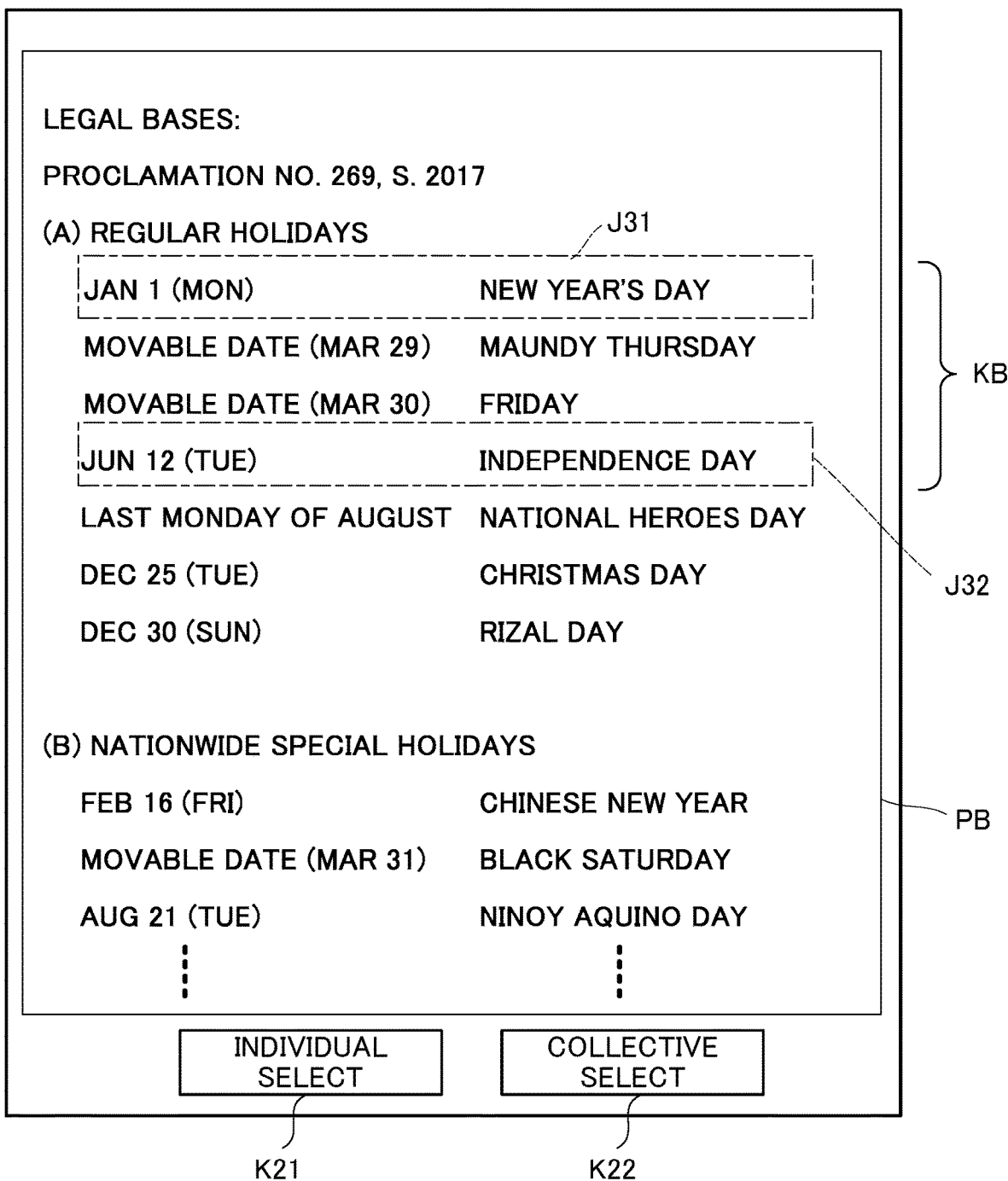
FIG. 12 is a view showing another modification for specifying strip-shaped regions in the image being displayed on the display device.

Alternatively, when the user makes a swipe gesture twice to specify two strip-shaped regions J31, J32, the controller 21 detects, through the touch panel 12, the two strip-shaped regions J31, J32 as shown in FIG. 12, defines an area KB between the strip-shaped regions J31, J32 (exclusive of the strip-shaped regions J31, J32), subjects the area KB to OCR processing to detect a plurality of lines of texts present in the area KB, subjects the detected texts to the processing tasks in steps S204 and S205 to extract the dates and times of events from portions of the detected texts and also extract the titles of the events from the remaining portions of the texts, and allows the storage device 18 to store a plurality of sets of schedule data each containing a pair of extracted and associated date and time and title of an event.

The structure and configuration of the above embodiments described with reference to FIGS. 1 to 12 are merely illustrative of the present disclosure and not intended to limit the present disclosure to the above particular structure and configuration.

While the present disclosure has been described in detail with reference to the embodiments thereof, it would be apparent to those skilled in the art the various changes and modifications may be made therein within the scope defined by the appended claims.

What is claimed is:

1. An information processing apparatus comprising:
    a camera that captures an image;
    a display device that displays the image captured by the camera;
    a touch panel provided on a screen of the display device; and
    a control device that includes a processor and functions, through the processor executing a control program, as a controller that, upon specification of, based on a trajectory of a swipe gesture accepted by the touch panel on the image being displayed on the display device, a strip-shaped region containing start and end points of the swipe gesture and having a predetermined constant width perpendicular to a direction of the swipe gesture, recognizes a text in the specified region, extracts from the recognized text a title of an event and a date, associates the extracted title of the event and date with each other, and sets the associated title of the event and date as schedule data, wherein when two regions in the image being displayed on the display device are sequentially specified by the gestures on the touch panel, the controller recognizes, based on an order predetermined in terms of the title of the event and the date, a first text in the region specified at first, extracts, from the first text, one of the title of the event and the date predetermined as a first position in the order, recognizes a second text in the region specified later, and extracts, from the second text, the other of the title of the event and the date predetermined as a second position in the order.

2. The information processing apparatus according to claim 1, wherein when extracting two times with the date from the recognized text, the controller determines the time having a smaller numerical value to be a starting time of the event and determines the time having a larger numerical value to be an ending time of the event.

3. The information processing apparatus according to claim 1, wherein the controller allows the display device to display, based on the title of the event and the date both indicated by the schedule data, a calendar showing the title of the event and highlighting the date.

4. An information processing apparatus comprising:
a camera that captures an image;
a display device that displays the image captured by the camera;
a touch panel provided on a screen of the display device; and
a control device that includes a processor and functions, through the processor executing a control program, as a controller that, upon specification of, based on a trajectory of a swipe gesture accepted by the touch panel on the image being displayed on the display device, a strip-shaped region containing start and end points of the swipe gesture and having a predetermined constant width perpendicular to a direction of the swipe gesture, recognizes a text in the specified region, extracts from the recognized text a title of an event and a date, associates the extracted title of the event and date with each other, and sets the associated title of the event and date as schedule data,
wherein when three or more regions in the image being displayed on the display device are sequentially specified by the gestures on the touch panel, the controller recognizes a first text in the region specified at first, extracts the title of the event from the first text, recognizes respective second texts in the regions specified later, and extracts respective dates from the recognized second texts, associates the extracted dates with the title of the event, and sets the associated dates and title of the event as schedule data.

5. An information processing apparatus comprising:
a camera that captures an image;
a display device that displays the image captured by the camera;
a touch panel provided on a screen of the display device; and
a control device that includes a processor and functions, through the processor executing a control program, as a controller that, upon specification of, based on a trajectory of a swipe gesture accepted by the touch panel on the image being displayed on the display device, a strip-shaped region containing start and end points of the swipe gesture and having a predetermined constant width perpendicular to a direction of the swipe gesture, recognizes a text in the specified region, extracts from the recognized text a title of an event and a date, associates the extracted title of the event and date with each other, and sets the associated title of the event and date as schedule data,
wherein the information processing apparatus further comprising a storage device storing a date data table containing numerals and characters representing dates,
wherein when numerals or characters contained in the recognized text coincide with numerals or characters contained in the date data table, the controller extracts, as the date, the numerals or characters contained in the text.

* * * * *